United States Patent
Lee et al.

(10) Patent No.: US 9,625,011 B2
(45) Date of Patent: *Apr. 18, 2017

(54) PLANETARY GEAR TRAIN OF AUTOMATIC TRANSMISSION FOR VEHICLES

(71) Applicant: Hyundai Motor Company, Seoul (KR)

(72) Inventors: Chang Wook Lee, Suwon-si (KR); Sueng Ho Lee, Seoul (KR); JongSool Park, Hwaseong-si (KR); KyeongHun Lee, Seoul (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/924,528

(22) Filed: Oct. 27, 2015

(65) Prior Publication Data

US 2016/0169352 A1    Jun. 16, 2016

(30) Foreign Application Priority Data

Dec. 15, 2014   (KR) .......................... 10-2014-0180672

(51) Int. Cl.
*F16H 3/66*   (2006.01)

(52) U.S. Cl.
CPC ............... *F16H 3/666* (2013.01); *F16H 3/66* (2013.01); *F16H 2200/0065* (2013.01); *F16H 2200/2015* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 8,083,631 B2* | 12/2011 | Shiohara | F16H 3/666 |
| | | | 475/282 |
| 2012/0231917 A1 | 9/2012 | Phillips et al. | |
| 2014/0364269 A1* | 12/2014 | Kaltenbach | F16H 3/006 |
| | | | 475/282 |

FOREIGN PATENT DOCUMENTS

| | | |
|---|---|---|
| JP | 2005-172123 A | 6/2005 |
| KR | 10-1063505 B1 | 9/2011 |
| KR | 10-2013-0003981 A | 1/2013 |

* cited by examiner

*Primary Examiner* — Erin D Bishop
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque, a first planetary gear set including first, second, and third rotation elements, a second planetary gear set including fourth, fifth, and sixth rotation elements, a compound planetary gear set formed by combining third and fourth planetary gear sets and including seventh, eighth, ninth, and tenth rotation elements, a fifth planetary gear set including eleventh, twelfth, and thirteenth rotation elements, and six friction elements disposed between at least one rotation element among thirteen rotation elements and another rotation element or the input shaft, or between at least one rotation element among the thirteen rotation elements and a transmission housing.

20 Claims, 7 Drawing Sheets

FIG. 2

| Speed stage | Friction elements ||||||  Speed ratio | Step ratio | Entire speed ratio |
|---|---|---|---|---|---|---|---|---|---|
| | B1 | B2 | C1 | C2 | C3 | C4 | | | |
| 1ST | ● | ● | ● | | | | 6.104 | 1.645 | 9.207 |
| 2ND | ● | ● | | | ● | | 3.711 | 1.403 | |
| 3RD | | ● | ● | | ● | | 2.645 | 1.290 | |
| 4TH | | ● | | | ● | ● | 2.051 | 1.154 | |
| 5TH | | ● | ● | | | ● | 1.777 | 1.32 | |
| 6TH | | ● | ● | ● | | | 1.345 | 1.345 | |
| 7TH | | | ● | ● | ● | | 1.000 | 1.151 | |
| 8TH | ● | | ● | ● | | | 0.869 | 1.311 | |
| 9TH | ● | | ● | | | ● | 0.663 | | |
| REV | ● | ● | | ● | | | -4.000 | | |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2014-0180672 filed Dec. 15, 2014, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle which improves power delivery performance and reduces fuel consumption by achieving nine forward speed stages using a minimum number of constituent elements.

Description of Related Art

In recent years, a rise in oil price causes dashing into unlimited competition for enhancing fuel efficiency.

As a result, research into reduction of weight and the enhancement of fuel efficiency through down-sizing is conducted in the case of an engine and research for simultaneously securing operability and fuel efficiency competitiveness through multiple speed stages is conducted in the case of an automatic transmission.

However, in the automatic transmission, as the number of speed stages increase, the number of internal components increase, and as a result, mountability, transmission efficiency, and the like may still deteriorate and cost and weight may increase.

Accordingly, development of a planetary gear train which may bring about maximum efficiency with a small number of components may be important in order to increase a fuel efficiency enhancement effect through the multi-stages.

In this aspect, in recent years, 8 and 9-speed automatic transmissions tend to be implemented and the research and development of a planetary gear train capable of implementing more speed stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that implements nine forward speed stages and one reverse speed stage with a minimum configuration and reduces drag torque by minimizing non-operated friction elements while three friction elements operate in respective gear stages to improve power transmission performance and fuel efficiency.

According to various aspects of the present invention, a planetary gear train of an automatic transmission for a vehicle may include an input shaft receiving torque of an engine, an output shaft outputting changed torque, a first planetary gear set including first, second, and third rotation elements, a second planetary gear set including fourth, fifth, and sixth rotation elements, a compound planetary gear set formed by combining third and fourth planetary gear sets and including seventh, eighth, ninth, and tenth rotation elements, a fifth planetary gear set including eleventh, twelfth, and thirteenth rotation elements, and six friction elements disposed between at least one rotation element among thirteen rotation elements and another rotation element or the input shaft, or between at least one rotation element among the thirteen rotation elements and a transmission housing, in which the input shaft may be continuously connected to the fifth rotation element, the output shaft may be continuously connected to the twelfth rotation element, the ninth rotation element may be selectively connected to the input shaft through a first clutch, the tenth rotation element may be continuously connected to the eleventh rotation element, the seventh rotation element may be continuously connected to the sixth rotation element, the seventh rotation element may be selectively connected to the twelfth rotation element so as to achieve a fourth forward speed stage, the eighth rotation element may be selectively connected to the twelfth rotation element so as to achieve a sixth forward speed stage, an eighth forward speed stage, and a reverse speed, and three friction elements among the six friction elements may be operated so as to achieve nine forward speed stages and at least one reverse speed stage.

The eighth rotation element may be selectively connected to the twelfth rotation element through a second clutch, two rotation elements among the seventh, eighth, ninth, and tenth rotation elements may be selectively connected to each other through a third clutch, and the seventh rotation element may be selectively connected to the twelfth rotation element through a fourth clutch.

The first rotation element may be continuously connected to the fourth rotation element, the second rotation element may be continuously connected to the thirteenth rotation element, the first rotation element may be selectively connected to the transmission housing through a first brake, and the third rotation element may be selectively connected to the transmission housing through a second brake.

A sun gear, a planet carrier, and a ring gear of the first planetary gear set may be set as the first, second, and third rotation elements, a sun gear, a planet carrier, and a ring gear of the second planetary gear set may be set as the fourth, fifth, and sixth rotation elements, and a sun gear, a planet carrier, and a ring gear of the fifth planetary gear set may be set as the eleventh, twelfth, and thirteenth rotation elements.

The compound planetary gear set may be formed by combining the third and fourth planetary gear sets that are single pinion planetary gear sets, the seventh rotation element may include third and fourth sun gears that are directly connected to each other, and the eighth rotation element may include third and fourth planet carriers that are directly connected to each other.

The compound planetary gear set may be formed by combining the third and fourth planetary gear sets that are single pinion planetary gear sets, the seventh rotation element may include third and fourth sun gears that are directly connected to each other, and the tenth rotation element may include third and fourth ring gears that are directly connected to each other.

The compound planetary gear set may be formed by combining the third and fourth planetary gear sets that are single pinion planetary gear sets, the seventh rotation element may include third and fourth sun gears that are directly connected to each other, and the ninth rotation element may include a third ring gear and a fourth planet carrier that are directly connected to each other.

The compound planetary gear set may be formed by combining the third planetary gear set that is a double pinion planetary gear set and the fourth planetary gear set that is a single pinion planetary gear set, the ninth rotation element may include a third ring gear and a fourth planet carrier that are directly connected to each other, and the tenth rotation element may include a third planet carrier and a fourth ring gear that are directly connected to each other.

The compound planetary gear set may be formed by combining the third planetary gear set that is a double pinion planetary gear set and the fourth planetary gear set that is a single pinion planetary gear set, the eighth rotation element may include a third sun gear and a fourth planet carrier that are directly connected to each other, and the ninth rotation element may include a third ring gear and a fourth ring gear that are directly connected to each other.

The compound planetary gear set may be formed by combining the third planetary gear set that is a single pinion planetary gear set and the fourth planetary gear set that is a double pinion planetary gear set, the eighth rotation element may include a third planet carrier and a fourth sun gear that are directly connected to each other, and the tenth rotation element may include a third ring gear and a fourth planet carrier that are connected to each other.

According to various aspects of the present invention, a planetary gear train of an automatic transmission for a vehicle may include an input shaft receiving torque of an engine, an output shaft outputting changed torque, a first planetary gear set including first, second, and third rotation elements, a second planetary gear set including fourth, fifth, and sixth rotation elements, a compound planetary gear set formed by combining third and fourth planetary gear sets and including seventh, eighth, ninth, and tenth rotation elements, a fifth planetary gear set including eleventh, twelfth, and thirteenth rotation elements, a first rotation shaft including the third rotation element, a second rotation shaft including the second and thirteenth rotation elements, a third rotation shaft including the first and fourth rotation elements, a fourth rotation shaft including the fifth rotation element and directly connected to the input shaft, a fifth rotation shaft including the sixth rotation element and the seventh rotation element, a sixth rotation shaft including the eighth rotation element, a seventh rotation shaft including the ninth rotation element, an eighth rotation shaft including the tenth rotation element and the eleventh rotation element, a ninth rotation shaft including the twelfth rotation element and directly connected to the output shaft, a first clutch selectively connecting the fourth rotation shaft to the seventh rotation shaft, a second clutch selectively connecting the sixth rotation shaft to the ninth rotation shaft, a third clutch connecting any two rotation shafts among the fifth, sixth, seventh, and eighth rotation shafts so as to direct-couple the third and fourth planetary gear sets, a fourth clutch selectively connecting the fifth rotation shaft to the ninth rotation shaft, a first brake selectively connecting the third rotation shaft to a transmission housing, and a second brake selectively connecting the first rotation shaft to the transmission housing.

The first planetary gear set may be a single pinion planetary gear set and may include a first sun gear that is the first rotation element, a first planet carrier that is the second rotation element, and a first ring gear that is the third rotation element, the second planetary gear set may be a single pinion planetary gear set and may include a second sun gear that is the fourth rotation element, a second planet carrier that is the fifth rotation element, and a second ring gear that is the sixth rotation element, the compound planetary gear set may be formed by combining the third and fourth planetary gear sets that are single pinion planetary gear sets, and may include third and fourth sun gears that are the seventh rotation element, third and fourth planet carriers that are the eighth rotation element, a fourth ring gear that is the ninth rotation element, and a third ring gear that is the tenth rotation element, and the fifth planetary gear set may be a single pinion planetary gear set and may include a fifth sun gear that is the eleventh rotation element, a fifth planet carrier that is the twelfth rotation element, and a fifth ring gear that is the thirteenth rotation element.

The first planetary gear set may be a single pinion planetary gear set and may include a first sun gear that is the first rotation element, a first planet carrier that is the second rotation element, and a first ring gear that is the third rotation element, the second planetary gear set may be a single pinion planetary gear set and may include a second sun gear that is the fourth rotation element, a second planet carrier that is the fifth rotation element, and a second ring gear that is the sixth rotation element, the compound planetary gear set may be formed by combining the third and fourth planetary gear sets that are single pinion planetary gear sets, and may include third and fourth sun gears that are the seventh rotation element, a third planet carrier that is the eighth rotation element, a fourth planet carrier that is the ninth rotation element, and third and fourth ring gears that are the tenth rotation element, and the fifth planetary gear set may be a single pinion planetary gear set and may include a fifth sun gear that is the eleventh rotation element, a fifth planet carrier that is the twelfth rotation element, and a fifth ring gear that is the thirteenth rotation element.

The first planetary gear set may be a single pinion planetary gear set and may include a first sun gear that is the first rotation element, a first planet carrier that is the second rotation element, and a first ring gear that is the third rotation element, the second planetary gear set may be a single pinion planetary gear set and may include a second sun gear that is the fourth rotation element, a second planet carrier that is the fifth rotation element, and a second ring gear that is the sixth rotation element, the compound planetary gear set may be formed by combining the third and fourth planetary gear sets that are single pinion planetary gear sets, and may include third and fourth sun gears that are the seventh rotation element, a third planet carrier that is the eighth rotation element, a third ring gear and a fourth planet carrier that are the ninth rotation element, and a fourth ring gear that is the tenth rotation element, and the fifth planetary gear set may be a single pinion planetary gear set and may include a fifth sun gear that is the eleventh rotation element, a fifth planet carrier that is the twelfth rotation element, and a fifth ring gear that is the thirteenth rotation element.

The first planetary gear set may be a single pinion planetary gear set and may include a first sun gear that is the first rotation element, a first planet carrier that is the second rotation element, and a first ring gear that is the third rotation element, the second planetary gear set may be a single pinion planetary gear set and may include a second sun gear that is the fourth rotation element, a second planet carrier that is the fifth rotation element, and a second ring gear that is the sixth rotation element, the compound planetary gear set may be formed by combining the third planetary gear set that is a double pinion planetary gear set and the fourth planetary gear set that is a single pinion planetary gear set, and may include a fourth sun gear that is the seventh rotation element, a third sun gear that is the eighth rotation element, a third ring gear and a fourth planet carrier that are the ninth rotation element, and a third planet carrier and a fourth ring gear that are the tenth rotation element, and the fifth planetary gear set may be a single pinion planetary gear set and may include a fifth sun gear that is the eleventh rotation element, a fifth planet carrier that is the twelfth rotation element, and a fifth ring gear that is the thirteenth rotation element.

The first planetary gear set may be a single pinion planetary gear set and may include a first sun gear that is the first rotation element, a first planet carrier that is the second rotation element, and a first ring gear that is the third rotation element, the second planetary gear set may be a single pinion planetary gear set and may include a second sun gear that is the fourth rotation element, a second planet carrier that is the fifth rotation element, and a second ring gear that is the sixth rotation element, the compound planetary gear set may be formed by combining the third planetary gear set that is a double pinion planetary gear set and the fourth planetary gear set that is a single pinion planetary gear set, and may include a fourth sun gear that is the seventh rotation element, a third sun gear and a fourth planet carrier that are the eighth rotation element, a third ring gear and a fourth ring gear that are the ninth rotation element, and a third planet carrier that is the tenth rotation element, and the fifth planetary gear set may be a single pinion planetary gear set and includes a fifth sun gear that is the eleventh rotation element, a fifth planet carrier that is the twelfth rotation element, and a fifth ring gear that is the thirteenth rotation element.

The first planetary gear set may be a single pinion planetary gear set and may include a first sun gear that is the first rotation element, a first planet carrier that is the second rotation element, and a first ring gear that is the third rotation element, the second planetary gear set may be a single pinion planetary gear set and may include a second sun gear that is the fourth rotation element, a second planet carrier that is the fifth rotation element, and a second ring gear that is the sixth rotation element, the compound planetary gear set may be formed by combining the third planetary gear set that is a single pinion planetary gear set and the fourth planetary gear set that is a double pinion planetary gear set, and may include a third sun gear that is the seventh rotation element, a third planet carrier and a fourth sun gear that are the eighth rotation element, a fourth ring gear that is the ninth rotation element, and a third ring gear and a fourth planet carrier that are the tenth rotation element, and the fifth planetary gear set may be a single pinion planetary gear set and may include a fifth sun gear that is the eleventh rotation element, a fifth planet carrier that is the twelfth rotation element, and a fifth ring gear that is the thirteenth rotation element.

The third clutch may be disposed between the fifth rotation shaft and the seventh rotation shaft.

The third clutch may be disposed between the seventh rotation shaft and the eighth rotation shaft.

The third clutch may be disposed between the sixth rotation shaft and the seventh rotation shaft.

Various embodiments of the present invention may achieve nine forward speed stages by combining five planetary gear sets that are simple planetary gear sets with six friction elements.

In addition, three friction elements operate at each speed stage, and as a result, a friction drag loss is decreased by minimizing the number of friction elements which do not operate. Therefore, drag torque and power loss may be reduced.

In addition, engine driving efficiency may be maximized by maintaining entire speed ratio to be large than or equal to 9.0.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed in the exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
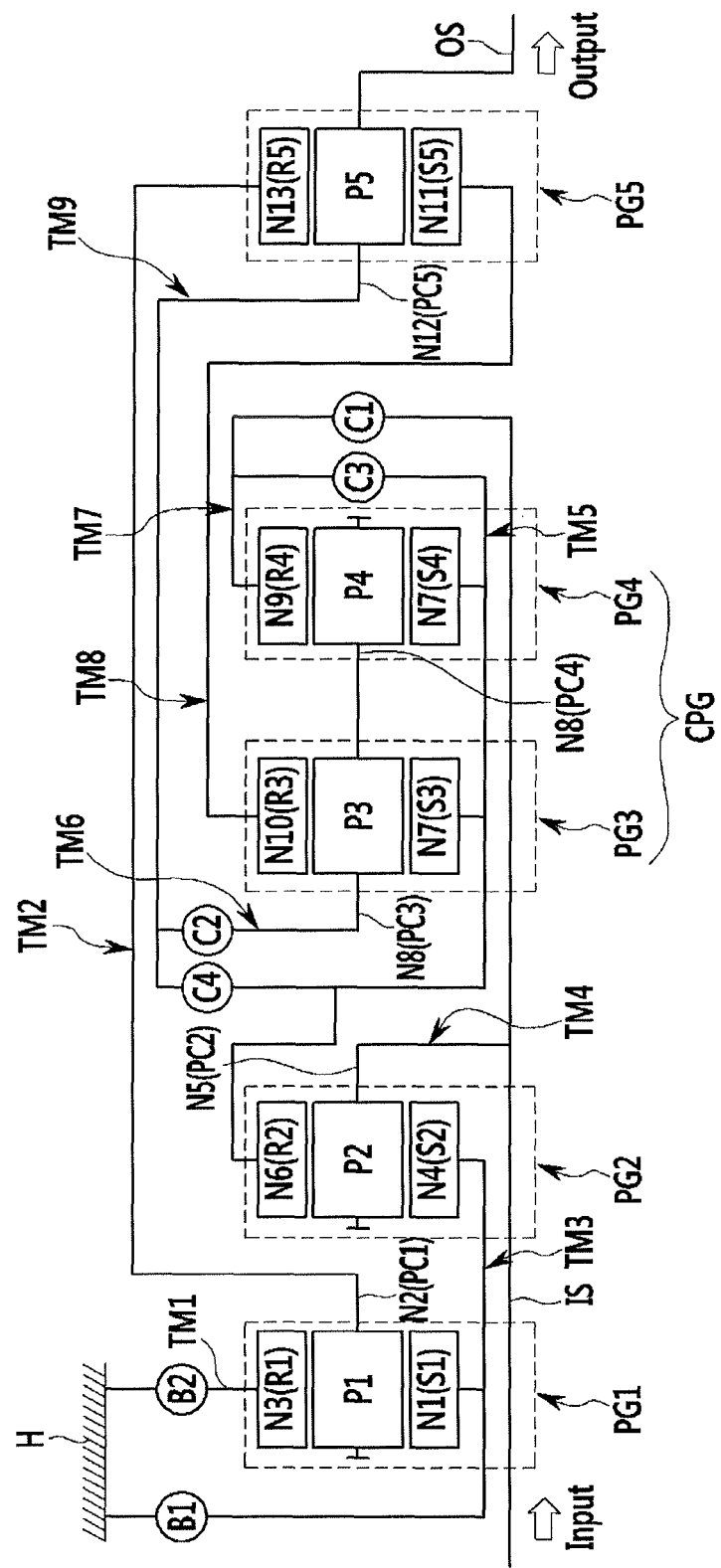
FIG. 1 is a schematic diagram of an exemplary planetary gear train according to the present invention.

FIG. 1 is a schematic diagram of a planetary gear train according to various embodiments of the present invention.

Referring to FIG. 1, a planetary gear train according to various embodiments of the present invention includes first, second, third, fourth, and fifth planetary gear sets PG1, PG2, PG3, PG4, and PG5 disposed on the same axis, an input shaft IS, an output shaft OS, nine rotation shafts TM1 to TM9 including at least one of rotation elements of the first, second, third, fourth, and fifth planetary gear sets PG1, PG2, PG3, PG4, and PG5, six friction elements C1 to C4 and B1 to B2, and a transmission housing H.

As a result, torque input from the input shaft IS is changed by cooperation of the first, second, third, fourth, and fifth planetary gear sets PG1, PG2, PG3, PG4, and PG5, and the changed torque is output through the output shaft OS.

The planetary gear sets are disposed in a sequence of the first, second, third, fourth, and fifth planetary gear sets PG1, PG2, PG3, PG4, and PG5 from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set, and includes a first sun gear S1 of a first rotation element N1, a first planet carrier PC1 of a second rotation element N2 rotatably supporting a first pinion P1 externally engaged with the first sun gear S1, and a first ring gear R1 of a third rotation element N3 internally engaged with the first pinion P1.

The second planetary gear set PG2 is a single pinion planetary gear set, and includes a second sun gear S2 of a fourth rotation element N4, a second planet carrier PC2 of a fifth rotation element N5 rotatably supporting a second pinion P2 externally engaged with the second sun gear S2, and a second ring gear R2 of a sixth rotation element N6 internally engaged with the second pinion P2.

The third and fourth planetary gear sets PG3 and PG4 are single pinion planetary gear sets, and one rotation element of the third planetary gear set PG3 is directly connected to one rotation element of the fourth planetary gear set PG4 and another rotation element of the third planetary gear set PG3 is directly connected to another rotation element of the fourth planetary gear set PG4 such that the third and fourth planetary gear sets PG3 and PG4 operated as a compound planetary gear set CPG having four rotation elements. Herein, the compound planetary gear set CPG includes third and fourth sun gears S3 and S4 of a seventh rotation element N7, third and fourth planet carriers PC3 and PC4 of an eighth rotation element N8 rotatably supporting third and fourth pinions P3 and P4 externally engaged with the third and fourth sun gears S3 and S4 respectively, and a fourth ring gear R4 of a ninth rotation element N9 internally engaged with the fourth pinion P4, and a third ring gear R3 of a tenth rotation element N10 internally engaged with the third pinion P3.

The fifth planetary gear set PG5 is a single pinion planetary gear set, and includes a fifth sun gear S5 of an eleventh rotation element N11, a fifth planet carrier PC5 of a twelfth rotation element N12 rotatably supporting a fifth pinion P5 externally engaged with the fifth sun gear S5, and a fifth ring gear R5 of a thirteenth rotation element N13 internally engaged with the fifth pinion P5.

The first rotation element N1 is directly connected to the fourth rotation element N4, the second rotation element N2 is directly connected to the thirteenth rotation element N13, the sixth rotation element N6 is directly connected to the seventh rotation element N7, and the tenth rotation element N10 is directly connected to the eleventh rotation element N11 such that the first, second, third, fourth, and fifth planetary gear sets PG1, PG2, PG3, PG4, and PG5 have nine rotation shafts TM1 to TM9.

It is exemplified in FIG. 1 but is not limited that the third sun gear S3 and the fourth sun gear S4 are manufactured separately and then are connected. The third sun gear S3 and the fourth sun gear S4 may be formed integrally.

The nine rotation shafts TM1 to TM9 will be described in detail.

A first rotation shaft TM1 includes the third rotation element N3 and is selectively connected to the transmission housing H so as to be operated as a selective fixed element.

A second rotation shaft TM2 includes the second rotation element N2 and the thirteenth rotation element N13.

A third rotation shaft TM3 includes the first rotation element N1 and the fourth rotation element N4, and is selectively connected to the transmission housing H so as to be operated as a selective fixed element.

A fourth rotation shaft TM4 includes the fifth rotation element N5 and is directly connected to the input shaft IS so as to be continuously operated as an input element.

A fifth rotation shaft TM5 includes the sixth rotation element N6 and the seventh rotation element N7.

The sixth rotation shaft TM6 includes the eighth rotation element N8.

The seventh rotation shaft TM7 includes the ninth rotation element N9 and is selectively connected to the fourth rotation shaft TM4 or the fifth rotation shaft TM5.

The eighth rotation shaft TM8 includes the tenth rotation element N10 and the eleventh rotation element N11.

The ninth rotation shaft TM9 includes the twelfth rotation element N12, is selectively connected to the fifth rotation shaft TM5 or the sixth rotation shaft TM6, and is directly connected to the output shaft OS so as to be continuously operated as the output element.

In addition, four clutches C1, C2, C3, and C4 which are friction elements are disposed at connection portions between the input shaft IS and any one rotation shaft or between any two rotation shafts.

In addition, two brakes B1 and B2 which are friction elements are disposed at connection portions between any one rotation shaft and the transmission housing H.

The six friction elements C1 to C4 and B1 to B2 are described in further detail.

A first clutch C1 is disposed between the fourth rotation shaft TM4 and the seventh rotation shaft TM7 and selectively connects the fourth rotation shaft TM4 and the seventh rotation shaft TM7.

A second clutch C2 is disposed between the sixth rotation shaft TM6 and the ninth rotation shaft TM9 and selectively connects the sixth rotation shaft TM6 and the ninth rotation shaft TM9.

A third clutch C3 is disposed between the fifth rotation shaft TM5 and the seventh rotation shaft TM7 and selectively connects the fifth rotation shaft TM5 and the seventh rotation shaft TM7. As a result, the third planetary gear set PG3 and the fourth planetary gear set PG4 become direct-coupling states.

A fourth clutch C4 is disposed between the fifth rotation shaft TM5 and the ninth rotation shaft TM9 and selectively connects the fifth rotation shaft TM5 and the ninth rotation shaft TM9.

A first brake B1 is interposed between the third rotation shaft TM3 and the transmission housing H and causes the third rotation shaft TM3 to be operated as the selective fixed element.

A second brake B2 is interposed between the first rotation shaft TM1 and the transmission housing H and causes the first rotation shaft TM1 to be operated as the selective fixed element.

The friction elements including the first, second, third, and fourth clutches C1, C2, C3, and C4 and the first and second brakes B1 and B2 may be multi-plates friction elements of wet type that are operated by hydraulic pressure.

FIG. 2 is an operation chart of friction elements at each speed in the planetary gear train according to various embodiments of the present invention.

As shown in FIG. 2, three friction elements are operated at each speed stage in the planetary gear train according to various embodiments of the present invention.

The first clutch C1 and the first and second brakes B1 and B2 are operated at a first forward speed stage 1ST. The fourth rotation shaft TM4 and the seventh rotation shaft TM7 due to operation of the first clutch C1 are operated as the input elements, and the first, second, and third rotation shafts TM1, TM2, and TM3 are operated as the fixed elements by operation of the first and second brakes B1 and B2. Therefore, the first forward speed stage is achieved.

The third clutch C3 and the first and second brakes B1 and B2 are operated at a second forward speed stage 2ND. The fifth rotation shaft TM5 and the seventh rotation shaft TM7 are connected to each other by operation of the third clutch C3 and the third and fourth planetary gear sets PG3 and PG4 become the direct-coupling states. In addition, the fourth rotation shaft TM4 is operated as the input element and the first, second, and third rotation shafts TM1, TM2, and TM3 are operated as the fixed elements by operation of the first and second brakes B1 and B2. Therefore, the second forward speed stage is achieved.

The first and third clutches C1 and C3 and the second brake B2 are operated at a third forward speed stage 3RD. The fifth rotation shaft TM5 and the seventh rotation shaft TM7 are connected to each other by operation of the third clutch C3 and the third and fourth planetary gear sets PG3 and PG4 become the direct-coupling states. In addition, the fourth rotation shaft TM4 and the seventh rotation shaft TM7 due to operation of the first clutch C1 are operated as the input elements, and the first rotation shaft TM1 is operated as the fixed element by operation of the second brake B2. Therefore, the third forward speed stage is achieved.

The third and fourth clutches C3 and C4 and the second brake B2 are operated at a fourth forward speed stage 4TH. The fifth rotation shaft TM5 and the seventh rotation shaft TM7 are connected to each other by operation of the third clutch C3 and the third and fourth planetary gear sets PG3 and PG4 become the direct-coupling states. In addition, the fifth rotation shaft TM5 and the ninth rotation shaft TM9 are connected to each other by operation of the fourth clutch C4, the fourth rotation shaft TM4 is operated as the input element, and the first rotation shaft TM1 is operated as the fixed element by operation of the second brake B2. Therefore, the fourth forward speed stage is achieved.

The first and fourth clutches C1 and C4 and the second brake B2 are operated at a fifth forward speed stage 5TH. In a state that the fifth rotation shaft TM5 and the ninth rotation shaft TM9 are connected to each other by operation of the fourth clutch C4, the fourth rotation shaft TM4 and the seventh rotation shaft TM7 are operated as the input elements by operation of the first clutch C1 and the first rotation shaft TM1 is operated as the fixed element by operation of the second brake B2. Therefore, the fifth forward speed stage is achieved.

The first and second clutches C1 and C2 and the second brake B2 are operated at a sixth forward speed stage 6TH. In a state that the sixth rotation shaft TM6 and the ninth rotation shaft TM9 are connected to each other by operation of the second clutch C2, the fourth rotation shaft TM4 and the seventh rotation shaft TM7 are operated as the input elements by operation of the first clutch C1, and the first rotation shaft TM1 is operated as the fixed element by operation of the second brake B2. Therefore, the sixth forward speed stage is achieved.

The first, second, and third clutches C1, C2, and C3 are operated at a seventh forward speed stage 7TH. The sixth rotation shaft TM6 and the ninth rotation shaft TM9 are connected to each other by operation of the second clutch C2, the fifth rotation shaft TM5 and the seventh rotation shaft TM7 are connected to each other by operation of the third clutch C3, and the fourth rotation shaft TM4 and the seventh rotation shaft TM7 are operated as the input elements such that all the planetary gear sets become direct-coupling states. Therefore, the seventh forward speed stage is achieved. At the seventh forward speed stage, a rotation speed that is the same as that of the input shaft IS is output.

The first and second clutches C1 and C2 and the first brake B1 are operated at an eighth forward speed stage 8TH. In a state that the sixth rotation shaft TM6 and the ninth rotation shaft TM9 are connected to each other by operation of the second clutch C2, the fourth rotation shaft TM4 and the seventh rotation shaft TM7 are operated as the input elements by operation of the first clutch C1, and the third rotation shaft TM3 is operated as the fixed element by operation of the first brake B1. Therefore, the eighth forward speed stage is achieved.

The first and fourth clutches C1 and C4 and the first brake B1 are operated at a ninth forward speed stage 9TH. In a state that the fifth rotation shaft TM5 and the ninth rotation shaft TM9 are connected to each other by operation of the fourth clutch C4, the fourth rotation shaft TM4 and the seventh rotation shaft TM7 are operated as the input elements by operation of the first clutch C1, and the third rotation shaft TM3 is operated as the fixed element by operation of the first brake B1. Therefore, the ninth forward speed stage is achieved.

The second clutch C2 and the first and second brakes B1 and B2 are operated at a reverse speed stage REV. In a state that the sixth rotation shaft TM6 and the ninth rotation shaft TM9 are connected to each other by operation of the second clutch C2, the fourth rotation shaft TM4 is operated as the input element and the first, second, and third rotation shafts TM1, TM2, and TM3 are operated as the fixed elements by operation of the first and second brakes B1 and B2. Therefore, the reverse speed stage is achieved.

The planetary gear train according to various embodiments of the present invention may achieve nine forward speed stages and one reverse speed stage by controlling five planetary gear sets PG1, PG2, PG3, PG4, and PG5 through four clutches C1, C2, C3, and C4 and two brakes B1 and B2.

In addition, since three friction elements operate at each speed stage and the number of non-operating friction elements is minimized, a friction drag loss may be decreased. Therefore, drag torque and power loss may be reduced.

In addition, engine driving efficiency may be maximized by maintaining entire speed ratio to be large than or equal to 9.0.

Figure 3:
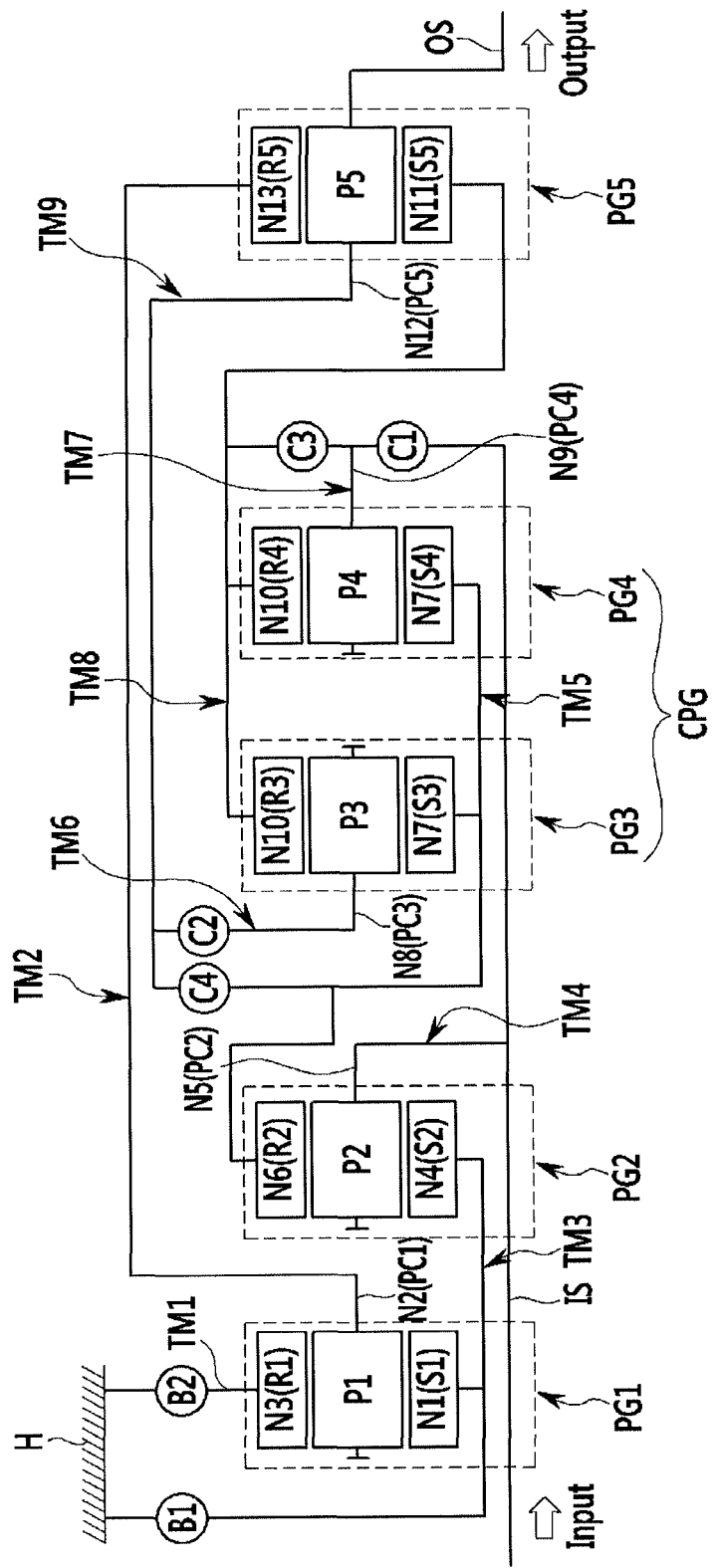
FIG. 3 is a schematic diagram of an exemplary planetary gear train according to the present invention.

FIG. 3 is a schematic diagram of a planetary gear train according to various embodiments of the present invention.

Referring to FIG. 3, connections of the third planetary gear set PG3 and the fourth planetary gear set PG3 forming the compound planetary gear set in a planetary gear train according to the various embodiments of FIG. 3 are different from those in previously described embodiments.

The compound planetary gear set CPG is formed by combining the third and fourth planetary gear sets PG3 and PG4 that are single pinion planetary gear sets, in which the third sun gear S3 is directly connected to the fourth sun gear S4 and the third planet carrier PC3 is directly connected to the fourth planet carrier PC4 in previously described embodiments.

However, the compound planetary gear set CPG is formed by combining the third and fourth planetary gear sets PG3 and PG4 that are single pinion planetary gear sets, in which the third sun gear S3 is directly connected to the fourth sun gear S4 and the third ring gear R3 is directly connected to the fourth ring gear R4 in the various embodiments of FIG. 3.

Therefore, a part of rotation elements included in the nine rotation shafts TM1 to TM9 is changed in the planetary gear train according to the various embodiments of FIG. 3. The nine rotation shafts TM1 to TM9 will be described with reference to FIG. 3.

The first rotation shaft TM1 includes the first ring gear R1 and is selectively connected to the transmission housing H so as to be operated as the selective fixed element.

The second rotation shaft TM2 includes the first planet carrier PC1 and the fifth ring gear R5.

The third rotation shaft TM3 includes the first sun gear S1 and the second sun gear S2, and is selectively connected to the transmission housing H so as to be operated as the selective fixed element.

The fourth rotation shaft TM4 includes the second planet carrier PC2 and is directly connected to the input shaft IS so as to be continuously operated as the input element.

The fifth rotation shaft TM5 includes the second ring gear R2 and the third and fourth sun gears S3 and S4.

The sixth rotation shaft TM6 includes the third planet carrier PC3.

The seventh rotation shaft TM7 includes the fourth planet carrier PC4 and is selectively connected to the fourth rotation shaft TM4.

The eighth rotation shaft TM8 includes the third and fourth ring gears R3 and R4 and the fifth sun gear S5, and is selectively connected to the seventh rotation shaft TM7.

The ninth rotation shaft TM9 includes the fifth planet carrier PC5, is selectively connected to the fifth rotation shaft TM5 or the sixth rotation shaft TM6, and is directly connected to the output shaft OS so as to be continuously operated as the output element.

In addition, four clutches C1, C2, C3, and C4 which are friction elements are disposed at connection portions between the input shaft IS and any one rotation shaft or between any two rotation shafts, and two brakes B1 and B2 which are friction elements are disposed at connection portions between any one rotation shaft and the transmission housing H.

Five friction elements other than the third clutch C3 among the six friction elements C1 to C4 and B1 to B2 in the various embodiments of FIG. 3 are disposed in the same way as those in previously described embodiments.

The third clutch C3 is used to direct-couple the third and fourth planetary gear sets PG3 and PG4 operated as the compound planetary gear set. The third clutch C3 is disposed between the fifth rotation shaft TM5 and the seventh rotation shaft TM7 in previously described embodiments, but is disposed between the seventh rotation shaft TM7 and the eighth rotation shaft TM8 in the various embodiments of FIG. 3.

Although the position of the third clutch C3 is changed, the function of the third clutch C3 is not changed.

Since shifting processes in the various embodiments of FIG. 3 are the same as those in previously described embodiments, detailed description thereof will be omitted.

Figure 4:
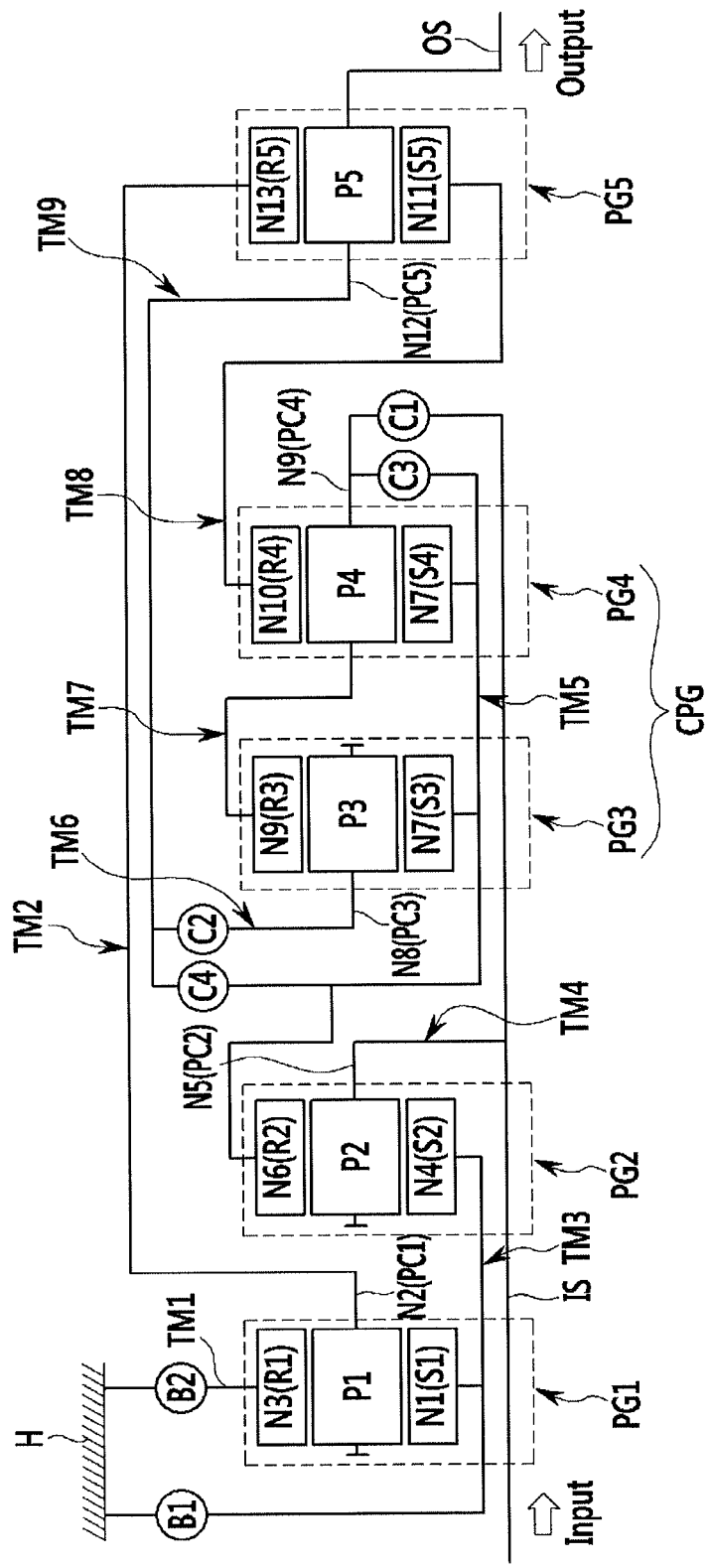
FIG. 4 is a schematic diagram of an exemplary planetary gear train according to the present invention.

FIG. 4 is a schematic diagram of a planetary gear train according to various embodiments of the present invention.

Referring to FIG. 4, connections of the third planetary gear set PG3 and the fourth planetary gear set PG4 forming the compound planetary gear set CPG in a planetary gear train according to various embodiments of the present invention are different from those in previously described embodiments.

The compound planetary gear set CPG is formed by combining the third and fourth planetary gear sets PG3 and PG4 that are single pinion planetary gear sets, in which the third sun gear S3 is directly connected to the fourth sun gear S4 and the third planet carrier PC3 is directly connected to the fourth planet carrier PC4 in previously described embodiments.

However, the compound planetary gear set CPG is formed by combining the third and fourth planetary gear sets PG3 and PG4 that are single pinion planetary gear sets, in which the third sun gear S3 is directly connected to the fourth sun gear S4 and the third ring gear R3 is directly connected to the fourth planet carrier PC4 in the various embodiments of FIG. 4.

Therefore, a part of rotation elements included in the nine rotation shafts TM1 to TM9 is changed in the planetary gear train according to the various embodiments of FIG. 4. The nine rotation shafts TM1 to TM9 will be described with reference to FIG. 4.

The first rotation shaft TM1 includes the first ring gear R1 and is selectively connected to the transmission housing H so as to be operated as the selective fixed element.

The second rotation shaft TM2 includes the first planet carrier PC1 and the fifth ring gear R5.

The third rotation shaft TM3 includes the first sun gear S1 and the second sun gear S2, and is selectively connected to the transmission housing H so as to be operated as the selective fixed element.

The fourth rotation shaft TM4 includes the second planet carrier PC2 and is directly connected to the input shaft IS so as to be continuously operated as the input element.

The fifth rotation shaft TM5 includes the second ring gear R2 and the third and fourth sun gears S3 and S4.

The sixth rotation shaft TM6 includes the third planet carrier PC3.

The seventh rotation shaft TM7 includes the third ring gear R3 and the fourth planet carrier PC4 and is selectively connected to the fourth rotation shaft TM4 or the fifth rotation shaft TM5.

The eighth rotation shaft TM8 includes the fourth ring gear R4 and the fifth sun gear S5.

The ninth rotation shaft TM9 includes the fifth planet carrier PC5, is selectively connected to the fifth rotation shaft TM5 or the sixth rotation shaft TM6, and is directly connected to the output shaft OS so as to be continuously operated as the output element.

In addition, four clutches C1, C2, C3, and C4 which are friction elements are disposed at connection portions between the input shaft IS and any one rotation shaft or between any two rotation shafts, and two brakes B1 and B2 which are friction elements are disposed at connection portions between any one rotation shaft and the transmission housing H.

Since positions of the six friction elements C1 to C4 and B1 to B2 and shifting processes in the various embodiments of FIG. 4 are the same as those in previously described embodiments, detailed description thereof will be omitted.

Figure 5:
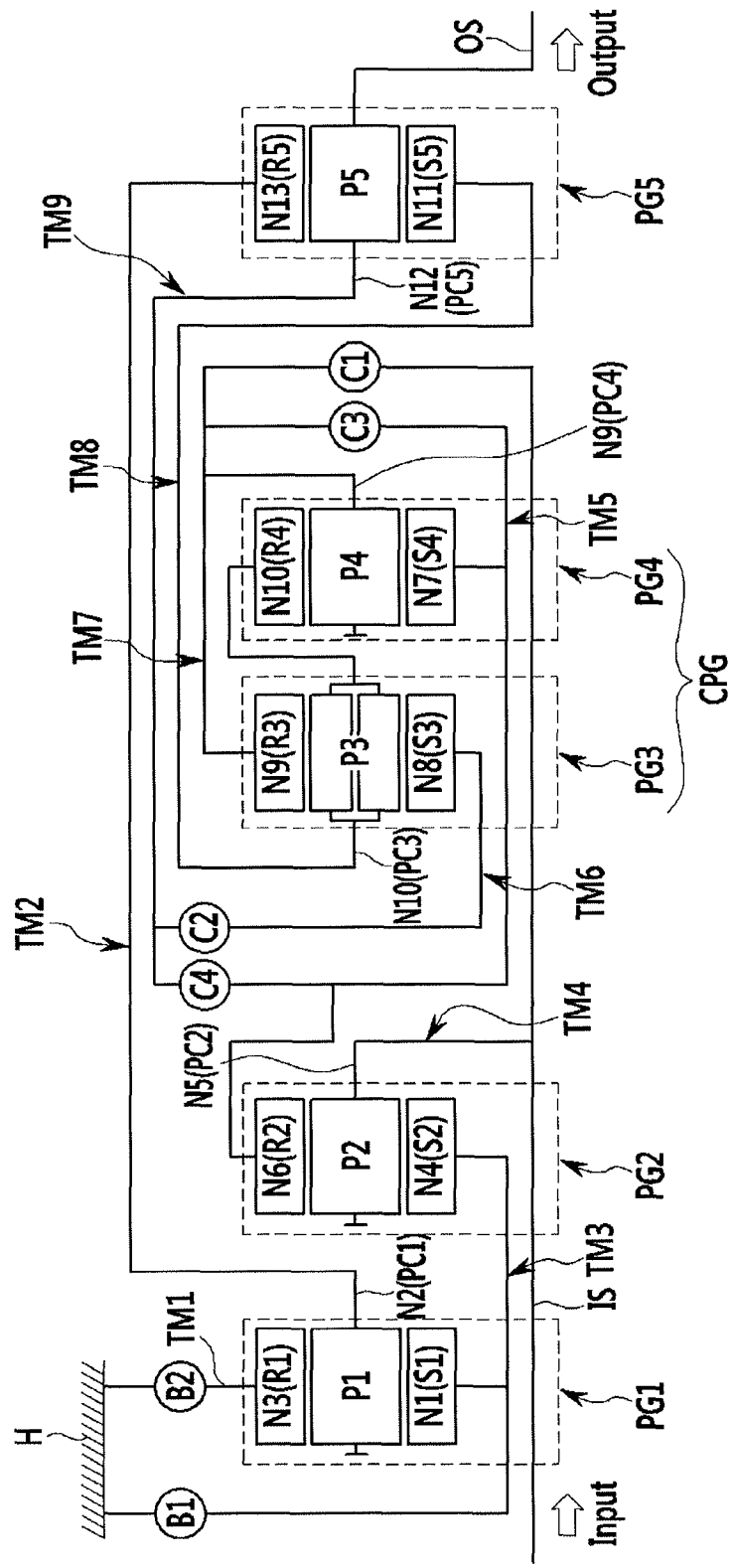
FIG. 5 is a schematic diagram of an exemplary planetary gear train according to the present invention.

FIG. 5 is a schematic diagram of a planetary gear train according to various embodiments of the present invention.

Referring to FIG. 5, connections of the third planetary gear set PG3 and the fourth planetary gear set PG3 forming the compound planetary gear set in a planetary gear train according to the various embodiments of FIG. 5 are different from those in previously described embodiments.

The compound planetary gear set CPG is formed by combining the third and fourth planetary gear sets PG3 and PG4 that are single pinion planetary gear sets, in which the third sun gear S3 is directly connected to the fourth sun gear S4 and the third planet carrier PC3 is directly connected to the fourth planet carrier PC4 in previously described embodiments.

However, the compound planetary gear set CPG is formed by combining the third planetary gear set PG3 that is a double pinion planetary gear set and the fourth planetary gear set PG4 that is a single pinion planetary gear set, in which the third planet carrier PC3 is directly connected to the fourth ring gear R4 and the third ring gear R3 is directly connected to the fourth planet carrier PC4 in the various embodiments of FIG. 5.

Therefore, a part of rotation elements included in the nine rotation shafts TM1 to TM9 is changed in the planetary gear train according to the various embodiments of FIG. 5. The nine rotation shafts TM1 to TM9 will be described with reference to FIG. 5.

The first rotation shaft TM1 includes the first ring gear R1 and is selectively connected to the transmission housing H so as to be operated as the selective fixed element.

The second rotation shaft TM2 includes the first planet carrier PC1 and the fifth ring gear R5.

The third rotation shaft TM3 includes the first sun gear S1 and the second sun gear S2, and is selectively connected to the transmission housing H so as to be operated as the selective fixed element.

The fourth rotation shaft TM4 includes the second planet carrier PC2 and is directly connected to the input shaft IS so as to be continuously operated as the input element.

The fifth rotation shaft TM5 includes the second ring gear R2 and the fourth sun gear S4.

The sixth rotation shaft TM6 includes the third sun gear S3.

The seventh rotation shaft TM7 includes the third ring gear R3 and the fourth planet carrier PC4 and is selectively connected to the fourth rotation shaft TM4 or the fifth rotation shaft TM5.

The eighth rotation shaft TM8 includes the third planet carrier PC3, the fourth ring gear R4, and the fifth sun gear S5.

The ninth rotation shaft TM9 includes the fifth planet carrier PC5, is selectively connected to the fifth rotation shaft TM5 or the sixth rotation shaft TM6, and is directly connected to the output shaft OS so as to be continuously operated as the output element.

In addition, four clutches C1, C2, C3, and C4 which are friction elements are disposed at connection portions between the input shaft IS and any one rotation shaft or between any two rotation shafts, and two brakes B1 and B2 which are friction elements are disposed at connection portions between any one rotation shaft and the transmission housing H.

Since positions of the six friction elements C1 to C4 and B1 to B2 and shifting processes in the various embodiments of FIG. 5 are the same as those in previously described embodiments, detailed description thereof will be omitted.

Figure 6:
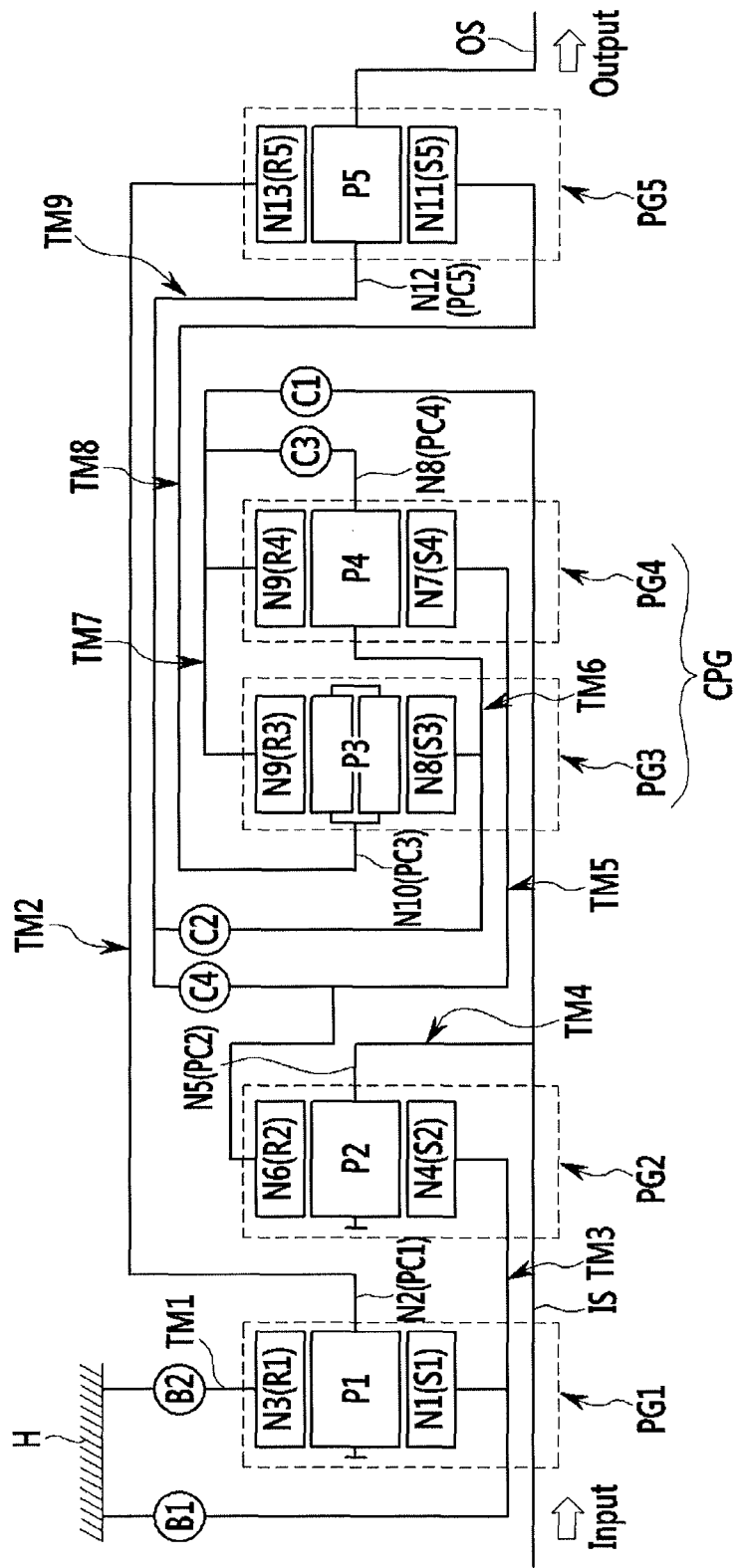
FIG. 6 is a schematic diagram of an exemplary planetary gear train according to the present invention.

FIG. 6 is a schematic diagram of a planetary gear train according to various embodiments of the present invention.

Referring to FIG. 6, connections of the third planetary gear set PG3 and the fourth planetary gear set PG3 forming the compound planetary gear set in a planetary gear train according to the various embodiments of FIG. 6 are different from those in previously described embodiments.

The compound planetary gear set CPG is formed by combining the third and fourth planetary gear sets PG3 and PG4 that are single pinion planetary gear sets, in which the third sun gear S3 is directly connected to the fourth sun gear S4 and the third planet carrier PC3 is directly connected to the fourth planet carrier PC4 in previously described embodiments.

However, the compound planetary gear set CPG is formed by combining the third planetary gear set PG3 that is a double pinion planetary gear set and the fourth planetary gear set PG4 that is a single pinion planetary gear set, in which the third sun gear S3 is directly connected to the fourth planet carrier PC4 and the third ring gear R3 is directly connected to the fourth ring gear R4.

Therefore, a part of rotation elements included in the nine rotation shafts TM1 to TM9 is changed in the planetary gear train according to the various embodiments of FIG. 6. The nine rotation shafts TM1 to TM9 will be described with reference to FIG. 6.

The first rotation shaft TM1 includes the first ring gear R1 and is selectively connected to the transmission housing H so as to be operated as the selective fixed element.

The second rotation shaft TM2 includes the first planet carrier PC1 and the fifth ring gear R5.

The third rotation shaft TM3 includes the first sun gear S1 and the second sun gear S2, and is selectively connected to the transmission housing H so as to be operated as the selective fixed element.

The fourth rotation shaft TM4 includes the second planet carrier PC2 and is directly connected to the input shaft IS so as to be continuously operated as the input element.

The fifth rotation shaft TM5 includes the second ring gear R2 and the fourth sun gear S4.

The sixth rotation shaft TM6 includes the third sun gear S3 and the fourth planet carrier PC4.

The seventh rotation shaft TM7 includes the third ring gear R3 and the fourth ring gear R4 and is selectively connected to the fourth rotation shaft TM4 or the sixth rotation shaft TM6.

The eighth rotation shaft TM8 includes the third planet carrier PC3 and the fifth sun gear S5.

The ninth rotation shaft TM9 includes the fifth planet carrier PC5, is selectively connected to the fifth rotation shaft TM5 or the sixth rotation shaft TM6, and is directly connected to the output shaft OS so as to be continuously operated as the output element.

Five friction elements other than the third clutch C3 among the six friction elements C1 to C4 and B1 to B2 in the various embodiments of FIG. 6 are disposed in the same way as those in previously described embodiments.

The third clutch C3 is used to direct-couple the third and fourth planetary gear sets PG3 and PG4 operated as the compound planetary gear set. The third clutch C3 is disposed between the fifth rotation shaft TM5 and the seventh rotation shaft TM7 in previously described embodiments, but is disposed between the sixth rotation shaft TM6 and the seventh rotation shaft TM7 in the various embodiments of FIG. 6.

Although the position of the third clutch C3 is changed, the function of the third clutch C3 is not changed.

Since shifting processes in the various embodiments of FIG. 6 are the same as those in previously described embodiments, detailed description thereof will be omitted.

Figure 7:
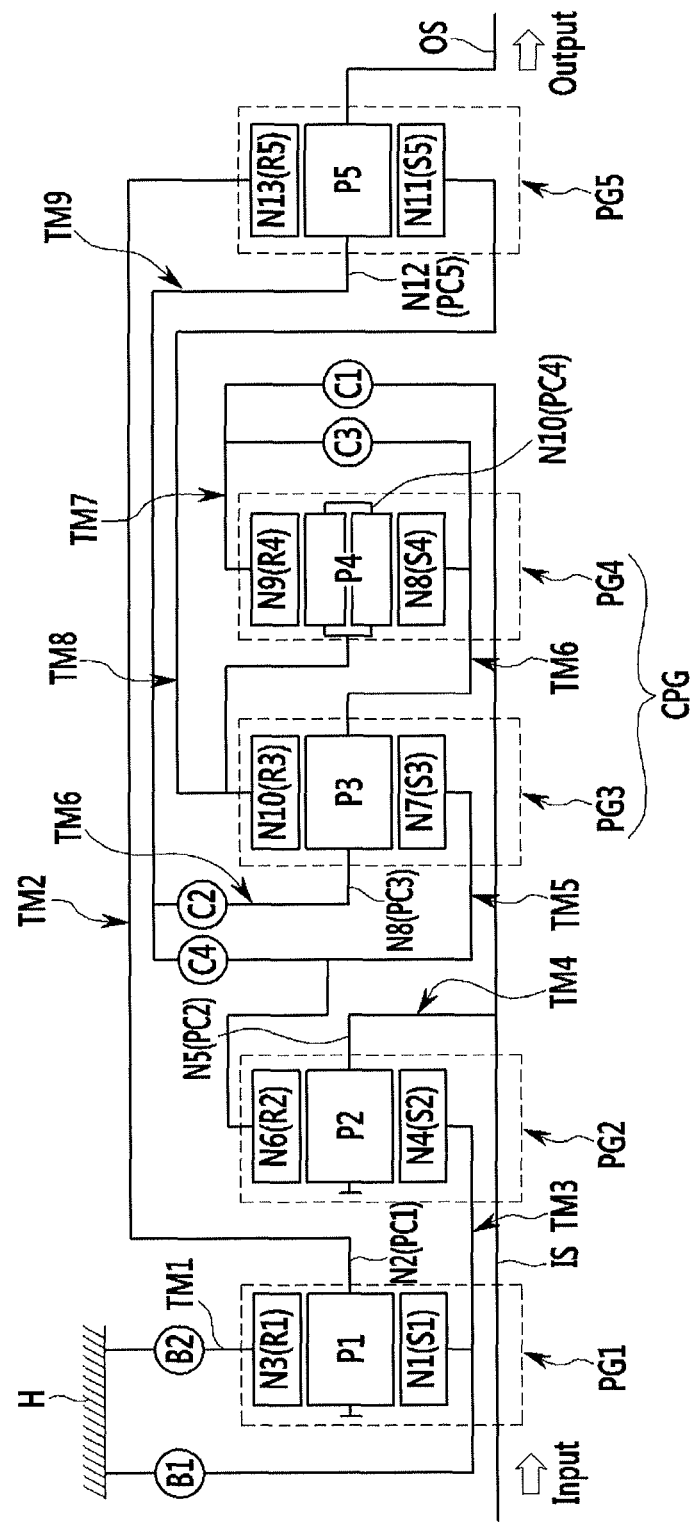
FIG. 7 is a schematic diagram of an exemplary planetary gear train according to the present invention.

FIG. 7 is a schematic diagram of a planetary gear train according to various embodiments of the present invention.

Referring to FIG. 7, connections of the third planetary gear set PG3 and the fourth planetary gear set PG3 forming the compound planetary gear set in a planetary gear train according to the various embodiments of FIG. 7 are different from those in previously described embodiments.

The compound planetary gear set CPG is formed by combining the third and fourth planetary gear sets PG3 and PG4 that are single pinion planetary gear sets, in which the third sun gear S3 is directly connected to the fourth sun gear S4 and the third planet carrier PC3 is directly connected to the fourth planet carrier PC4 in previously described embodiments.

However, the compound planetary gear set CPG is formed by combining the third planetary gear set PG3 that is a single pinion planetary gear set and the fourth planetary gear set PG4 that is a double pinion planetary gear set, in which the third planet carrier PC3 is directly connected to the fourth sun gear S4 and the third ring gear R3 is directly connected to the fourth planet carrier PC4.

Therefore, a part of rotation elements included in the nine rotation shafts TM1 to TM9 is changed in the planetary gear train according to the various embodiments of FIG. 7. The nine rotation shafts TM1 to TM9 will be described with reference to FIG. 7.

The first rotation shaft TM1 includes the first ring gear R1 and is selectively connected to the transmission housing H so as to be operated as the selective fixed element.

The second rotation shaft TM2 includes the first planet carrier PC1 and the fifth ring gear R5.

The third rotation shaft TM3 includes the first sun gear S1 and the second sun gear S2, and is selectively connected to the transmission housing H so as to be operated as the selective fixed element.

The fourth rotation shaft TM4 includes the second planet carrier PC2 and is directly connected to the input shaft IS so as to be continuously operated as the input element.

The fifth rotation shaft TM5 includes the second ring gear R2 and the third sun gear S3.

The sixth rotation shaft TM6 includes the third planet carrier PC3 and the fourth sun gear S4.

The seventh rotation shaft TM7 includes the fourth ring gear R4 and is selectively connected to the fourth rotation shaft TM4 or the sixth rotation shaft TM6.

The eighth rotation shaft TM8 includes the third ring gear R3, the fourth planet carrier PC4, and the fifth sun gear S5.

The ninth rotation shaft TM9 includes the fifth planet carrier PC5, is selectively connected to the fifth rotation shaft TM5 or the sixth rotation shaft TM6, and is directly connected to the output shaft OS so as to be continuously operated as the output element.

In addition, four clutches C1, C2, C3, and C4 which are friction elements are disposed at connection portions between the input shaft IS and any one rotation shaft or between any two rotation shafts, and two brakes B1 and B2 which are friction elements are disposed at connection portions between any one rotation shaft and the transmission housing H.

Five friction elements other than the third clutch C3 among the six friction elements C1 to C4 and B1 to B2 in the various embodiments of FIG. 7 are disposed in the same way as those in previously described embodiments.

The third clutch C3 is used to direct-couple the third and fourth planetary gear sets PG3 and PG4 operated as the compound planetary gear set. The third clutch C3 is disposed between the fifth rotation shaft TM5 and the seventh rotation shaft TM7 in previously described embodiments, but is disposed between the sixth rotation shaft TM6 and the seventh rotation shaft TM7 in the various embodiments of FIG. 7.

Although the position of the third clutch C3 is changed, the function of the third clutch C3 is not changed.

Since shifting processes in the various embodiments of FIG. 7 are the same as those in previously described embodiments, detailed description thereof will be omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque;
   a first planetary gear set including first, second, and third rotation elements;
   a second planetary gear set including fourth, fifth, and sixth rotation elements;
   a compound planetary gear set formed by combining third and fourth planetary gear sets and including seventh, eighth, ninth, and tenth rotation elements;
   a fifth planetary gear set including eleventh, twelfth, and thirteenth rotation elements; and
   six friction elements, including first, second, third, and fourth clutches, and first and second brakes,
   wherein the input shaft is continuously connected to the fifth rotation element,
   the output shaft is continuously connected to the twelfth rotation element,
   the ninth rotation element is selectively connected to the input shaft through the first clutch,
   the tenth rotation element is continuously connected to the eleventh rotation element,
   the seventh rotation element is continuously connected to the sixth rotation element,
   the seventh rotation element is selectively connected to the twelfth rotation element so as to achieve a fourth forward speed stage, and
   the eighth rotation element is selectively connected to the twelfth rotation element so as to achieve a sixth forward speed stage, an eighth forward speed stage, and a reverse speed stage,
   wherein at least three friction elements among the six friction elements are operated at each speed stage.

2. The planetary gear train of claim 1, wherein the eighth rotation element is selectively connected to the twelfth rotation element through the second clutch, two rotation elements among the seventh, eighth, ninth, and tenth rotation elements are selectively connected to each other through the third clutch, and the seventh rotation element is selectively connected to the twelfth rotation element through the fourth clutch.

3. The planetary gear train of claim 2, wherein the first rotation element is continuously connected to the fourth rotation element, the second rotation element is continuously connected to the thirteenth rotation element, the first rotation element is selectively connected to the transmission housing through the first brake, and the third rotation element is selectively connected to the transmission housing through the second brake.

4. The planetary gear train of claim 3, wherein a sun gear, a planet carrier, and a ring gear of the first planetary gear set are set as the first, second, and third rotation elements, respectively, a sun gear, a planet carrier, and a ring gear of the second planetary gear set are set as the fourth, fifth, and sixth rotation elements, respectively, and a sun gear, a planet carrier, and a ring gear of the fifth planetary gear set are set as the eleventh, twelfth, and thirteenth rotation elements, respectively.

5. The planetary gear train of claim 3, wherein the compound planetary gear set is formed by combining the third and fourth planetary gear sets that are single pinion planetary gear sets, the seventh rotation element includes third and fourth sun gears that are directly connected to each other, and the eighth rotation element includes third and fourth planet carriers that are directly connected to each other.

6. The planetary gear train of claim 3, wherein the compound planetary gear set is formed by combining the third and fourth planetary gear sets that are single pinion planetary gear sets, the seventh rotation element includes third and fourth sun gears that are directly connected to each other, and the tenth rotation element includes third and fourth ring gears that are directly connected to each other.

7. The planetary gear train of claim 3, wherein the compound planetary gear set is formed by combining the third and fourth planetary gear sets that are single pinion planetary gear sets, the seventh rotation element includes third and fourth sun gears that are directly connected to each other, and the ninth rotation element includes a third ring gear and a fourth planet carrier that are directly connected to each other.

8. The planetary gear train of claim 3, wherein the compound planetary gear set is formed by combining the third planetary gear set that is a double pinion planetary gear set and the fourth planetary gear set that is a single pinion planetary gear set, the ninth rotation element includes a third ring gear and a fourth planet carrier that are directly connected to each other, and the tenth rotation element includes a third planet carrier and a fourth ring gear that are directly connected to each other.

9. The planetary gear train of claim 3, wherein the compound planetary gear set is formed by combining the third planetary gear set that is a double pinion planetary gear set and the fourth planetary gear set that is a single pinion planetary gear set, the eighth rotation element includes a third sun gear and a fourth planet carrier that are directly connected to each other, and the ninth rotation element includes a third ring gear and a fourth ring gear that are directly connected to each other.

10. The planetary gear train of claim 3, wherein the compound planetary gear set is formed by combining the third planetary gear set that is a single pinion planetary gear set and the fourth planetary gear set that is a double pinion planetary gear set, the eighth rotation element includes a third planet carrier and a fourth sun gear that are directly connected to each other, and the tenth rotation element includes a third ring gear and a fourth planet carrier that are connected to each other.

11. A planetary gear train of an automatic transmission for a vehicle, comprising:

an input shaft receiving torque of an engine;

an output shaft outputting changed torque;

a first planetary gear set including first, second, and third rotation elements;

a second planetary gear set including fourth, fifth, and sixth rotation elements;

a compound planetary gear set formed by combining third and fourth planetary gear sets and including seventh, eighth, ninth, and tenth rotation elements;

a fifth planetary gear set including eleventh, twelfth, and thirteenth rotation elements;

a first rotation shaft including the third rotation element;

a second rotation shaft including the second and thirteenth rotation elements;

a third rotation shaft including the first and fourth rotation elements;

a fourth rotation shaft including the fifth rotation element and directly connected to the input shaft;

a fifth rotation shaft including the sixth rotation element and the seventh rotation element;

a sixth rotation shaft including the eighth rotation element;

a seventh rotation shaft including the ninth rotation element;

an eighth rotation shaft including the tenth rotation element and the eleventh rotation element;

a ninth rotation shaft including the twelfth rotation element and directly connected to the output shaft;

a first clutch selectively connecting the fourth rotation shaft to the seventh rotation shaft;

a second clutch selectively connecting the sixth rotation shaft to the ninth rotation shaft;

a third clutch connecting any two rotation shafts among the fifth, sixth, seventh, and eighth rotation shafts so as to direct-couple the third and fourth planetary gear sets;

a fourth clutch selectively connecting the fifth rotation shaft to the ninth rotation shaft;

a first brake selectively connecting the third rotation shaft to a transmission housing; and a second brake selectively connecting the first rotation shaft to the transmission housing.

12. The planetary gear train of claim 11, wherein the first planetary gear set is a single pinion planetary gear set and includes a first sun gear that is the first rotation element, a first planet carrier that is the second rotation element, and a first ring gear that is the third rotation element, the second planetary gear set is a single pinion planetary gear set and includes a second sun gear that is the fourth rotation element, a second planet carrier that is the fifth rotation element, and a second ring gear that is the sixth rotation element, the compound planetary gear set is formed by combining the third and fourth planetary gear sets that are single pinion planetary gear sets, and includes third and fourth sun gears that are the seventh rotation element, third and fourth planet carriers that are the eighth rotation element, a fourth ring gear that is the ninth rotation element, and a third ring gear that is the tenth rotation element, and the fifth planetary gear set is a single pinion planetary gear set and includes a fifth sun gear that is the eleventh rotation element, a fifth planet carrier that is the twelfth rotation element, and a fifth ring gear that is the thirteenth rotation element.

13. The planetary gear train of claim 11, wherein the first planetary gear set is a single pinion planetary gear set and includes a first sun gear that is the first rotation element, a first planet carrier that is the second rotation element, and a first ring gear that is the third rotation element, the second planetary gear set is a single pinion planetary gear set and includes a second sun gear that is the fourth rotation element, a second planet carrier that is the fifth rotation element, and a second ring gear that is the sixth rotation element, the compound planetary gear set is formed by combining the third and fourth planetary gear sets that are single pinion planetary gear sets, and includes third and fourth sun gears that are the seventh rotation element, a third planet carrier that is the eighth rotation element, a fourth planet carrier that is the ninth rotation element, and third and fourth ring gears that are the tenth rotation element, and the fifth planetary gear set is a single pinion planetary gear set and includes a fifth sun gear that is the eleventh rotation element, a fifth planet carrier that is the twelfth rotation element, and a fifth ring gear that is the thirteenth rotation element.

14. The planetary gear train of claim 11, wherein the first planetary gear set is a single pinion planetary gear set and includes a first sun gear that is the first rotation element, a first planet carrier that is the second rotation element, and a first ring gear that is the third rotation element, the second planetary gear set is a single pinion planetary gear set and includes a second sun gear that is the fourth rotation element, a second planet carrier that is the fifth rotation element, and a second ring gear that is the sixth rotation element, the compound planetary gear set is formed by combining the third and fourth planetary gear sets that are single pinion planetary gear sets, and includes third and fourth sun gears that are the seventh rotation element, a third planet carrier that is the eighth rotation element, a third ring gear and a fourth planet carrier that are the ninth rotation element, and a fourth ring gear that is the tenth rotation element, and the fifth planetary gear set is a single pinion planetary gear set and includes a fifth sun gear that is the eleventh rotation element, a fifth planet carrier that is the twelfth rotation element, and a fifth ring gear that is the thirteenth rotation element.

15. The planetary gear train of claim 11, wherein the first planetary gear set is a single pinion planetary gear set and includes a first sun gear that is the first rotation element, a first planet carrier that is the second rotation element, and a first ring gear that is the third rotation element, the second planetary gear set is a single pinion planetary gear set and includes a second sun gear that is the fourth rotation element, a second planet carrier that is the fifth rotation element, and a second ring gear that is the sixth rotation element, the compound planetary gear set is formed by combining the third planetary gear set that is a double pinion planetary gear set and the fourth planetary gear set that is a single pinion planetary gear set, and includes a fourth sun gear that is the seventh rotation element, a third sun gear that is the eighth rotation element, a third ring gear and a fourth planet carrier that are the ninth rotation element, and a third planet carrier and a fourth ring gear that are the tenth rotation element, and the fifth planetary gear set is a single pinion planetary gear set and includes a fifth sun gear that is the eleventh rotation element, a fifth planet carrier that is the twelfth rotation element, and a fifth ring gear that is the thirteenth rotation element.

16. The planetary gear train of claim 11, wherein the first planetary gear set is a single pinion planetary gear set and includes a first sun gear that is the first rotation element, a first planet carrier that is the second rotation element, and a first ring gear that is the third rotation element, the second planetary gear set is a single pinion planetary gear set and includes a second sun gear that is the fourth rotation element, a second planet carrier that is the fifth rotation element, and a second ring gear that is the sixth rotation element, the compound planetary gear set is formed by combining the third planetary gear set that is a double pinion planetary gear set and the fourth planetary gear set that is a single pinion planetary gear set, and includes a fourth sun gear that is the seventh rotation element, a third sun gear and a fourth planet carrier that are the eighth rotation element, a third ring gear and a fourth ring gear that are the ninth rotation element, and a third planet carrier that is the tenth rotation element, and the fifth planetary gear set is a single pinion planetary gear set and includes a fifth sun gear that is the eleventh rotation element, a fifth planet carrier that is the twelfth rotation element, and a fifth ring gear that is the thirteenth rotation element.

17. The planetary gear train of claim 11, wherein the first planetary gear set is a single pinion planetary gear set and includes a first sun gear that is the first rotation element, a first planet carrier that is the second rotation element, and a first ring gear that is the third rotation element, the second planetary gear set is a single pinion planetary gear set and includes a second sun gear that is the fourth rotation element, a second planet carrier that is the fifth rotation element, and a second ring gear that is the sixth rotation element, the compound planetary gear set is formed by combining the third planetary gear set that is a single pinion planetary gear set and the fourth planetary gear set that is a double pinion planetary gear set, and includes a third sun gear that is the seventh rotation element, a third planet carrier and a fourth sun gear that are the eighth rotation element, a fourth ring gear that is the ninth rotation element, and a third ring gear and a fourth planet carrier that are the tenth rotation element, and the fifth planetary gear set is a single pinion planetary gear set and includes a fifth sun gear that is the eleventh rotation element, a fifth planet carrier that is the twelfth rotation element, and a fifth ring gear that is the thirteenth rotation element.

18. The planetary gear train of claim 11, wherein the third clutch is disposed between the fifth rotation shaft and the seventh rotation shaft.

19. The planetary gear train of claim 11, wherein the third clutch is disposed between the seventh rotation shaft and the eighth rotation shaft.

20. The planetary gear train of claim 11, wherein the third clutch is disposed between the sixth rotation shaft and the seventh rotation shaft.

* * * * *